United States Patent
Leyden

(10) Patent No.: US 7,403,119 B2
(45) Date of Patent: Jul. 22, 2008

(54) NETWORKED SECURITY SYSTEM AND METHOD FOR MONITORING PORTABLE CONSUMER ARTICLES

(75) Inventor: Roger Leyden, Inverness, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 547 days.

(21) Appl. No.: 10/979,594

(22) Filed: Nov. 2, 2004

(65) Prior Publication Data

US 2006/0103528 A1    May 18, 2006

(51) Int. Cl.
G08B 13/14 (2006.01)
(52) U.S. Cl. ............... 340/568.8; 340/531; 340/568.2; 348/143; 705/28
(58) Field of Classification Search .............. 340/568.8, 340/568.1, 568.2, 568.4, 531, 506; 705/28; 348/143, 159, 135
See application file for complete search history.

(56) References Cited

U.S. PATENT DOCUMENTS

| | | | |
|---|---|---|---|
| 3,444,547 A | 5/1969 | Surek | |
| 3,665,448 A | 5/1972 | McGlinchey et al. | |
| 4,540,977 A | 9/1985 | Taillens et al. | |
| 4,746,909 A | 5/1988 | Israel et al. | |
| 4,962,369 A | 10/1990 | Close | |
| 5,543,782 A | 8/1996 | Rothbaum et al. | |
| 5,561,417 A | 10/1996 | Rothbaum et al. | |
| 5,726,627 A | 3/1998 | Kane et al. | |
| 5,745,036 A | 4/1998 | Clare | |
| 5,754,108 A | 5/1998 | Ungarsohn | |
| 5,821,857 A | 10/1998 | Rand | |
| 5,952,920 A | 9/1999 | Braddick | |
| 5,990,938 A | 11/1999 | Bern | |
| 5,995,004 A | 11/1999 | Pellowski | |
| 6,075,443 A | 6/2000 | Schepps et al. | |
| 6,104,289 A | 8/2000 | Rand | |
| 6,133,830 A * | 10/2000 | D'Angelo et al. | 340/571 |
| 6,198,391 B1 | 3/2001 | De Volpi | |
| 6,278,365 B1 | 8/2001 | Kane et al. | |
| 6,373,389 B1 * | 4/2002 | Przygoda et al. | 340/572.4 |
| 6,429,893 B1 | 8/2002 | Xin | |
| 7,002,467 B2 | 2/2006 | Deconinck et al. | |

* cited by examiner

*Primary Examiner*—Thomas Mullen
(74) *Attorney, Agent, or Firm*—Wood, Phillips, Katz, Clark & Mortimer

(57) ABSTRACT

A method of monitoring portable consumer articles at a display, which method includes the steps of: providing a first portable consumer article; providing a security system capable of interacting with the first portable consumer article at a first location; operatively interacting the first security system with the first portable consumer article; and interacting with the security system from a second location remote from the first location.

65 Claims, 3 Drawing Sheets

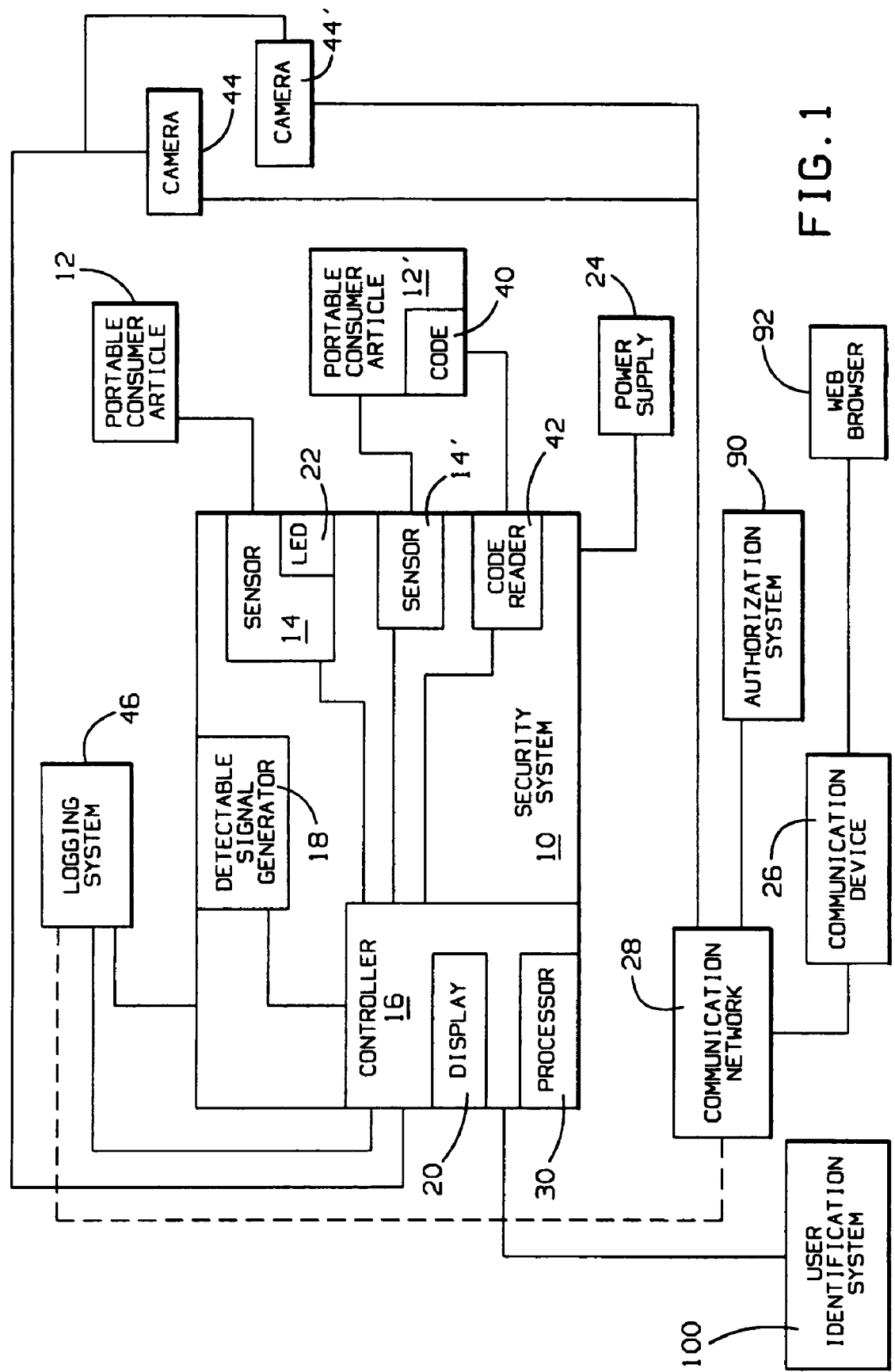

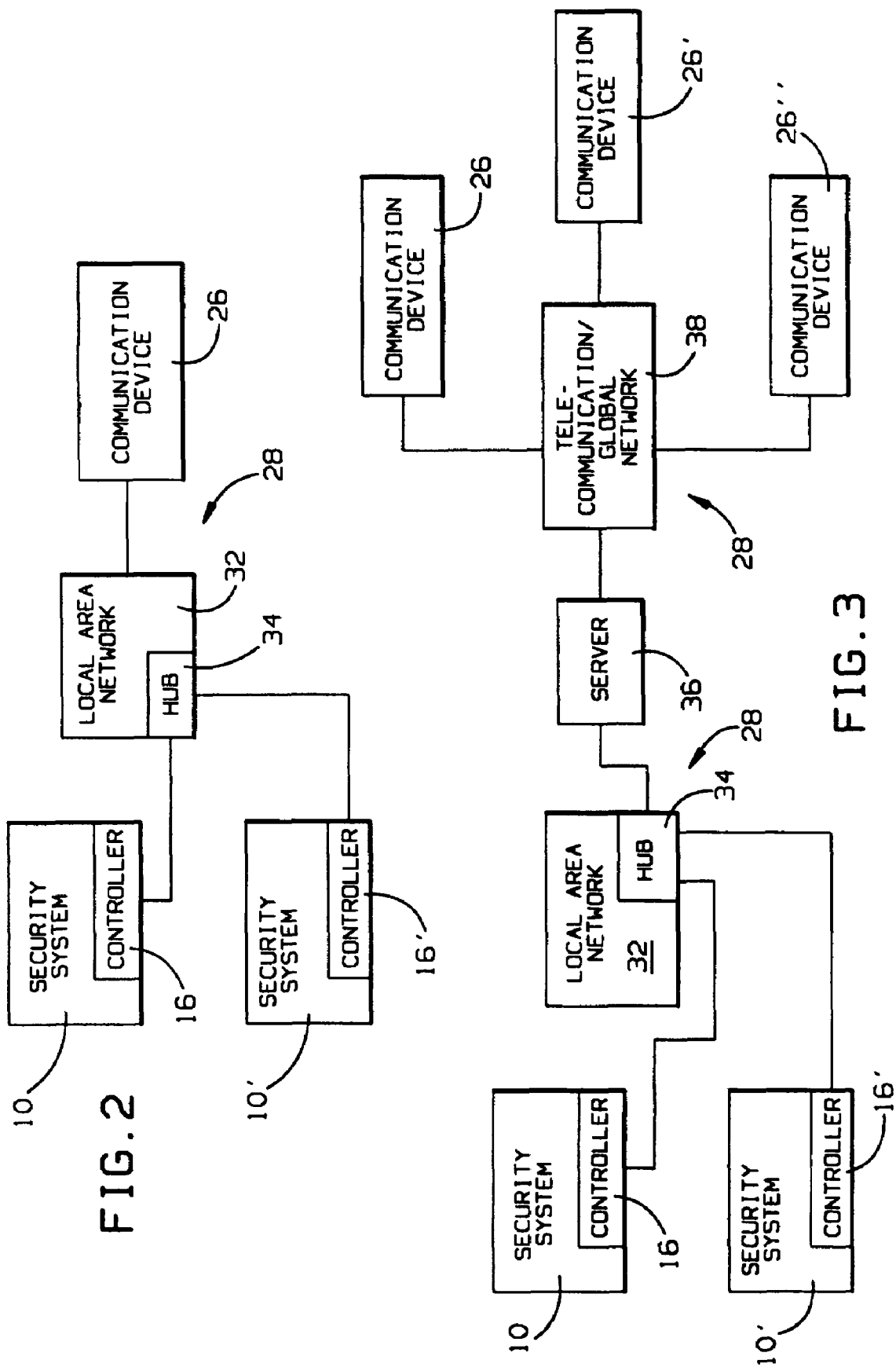

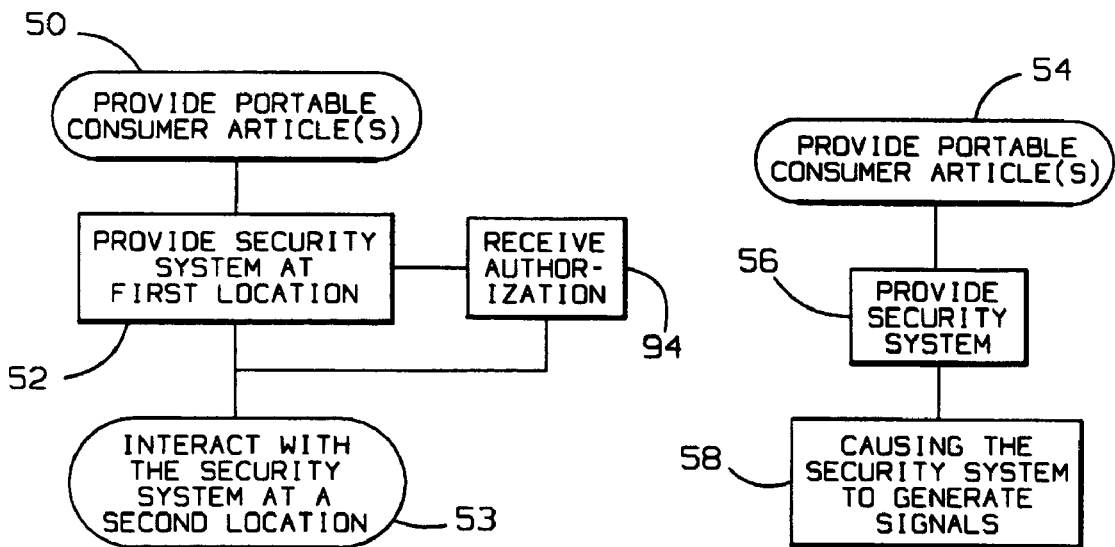
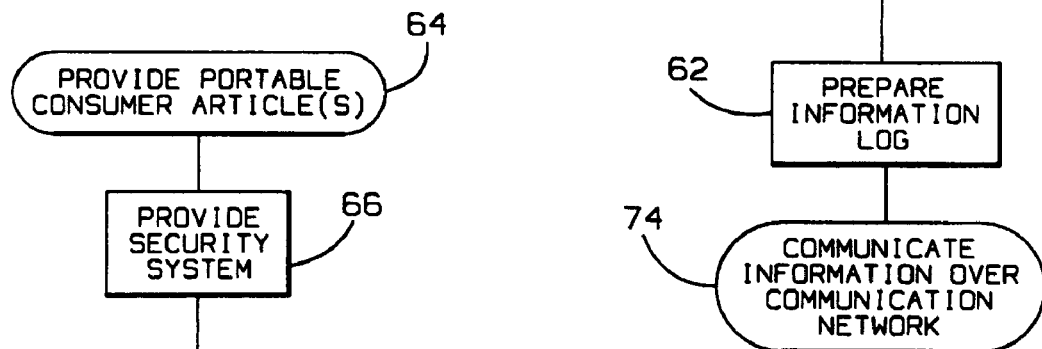
FIG. 4
FIG. 5
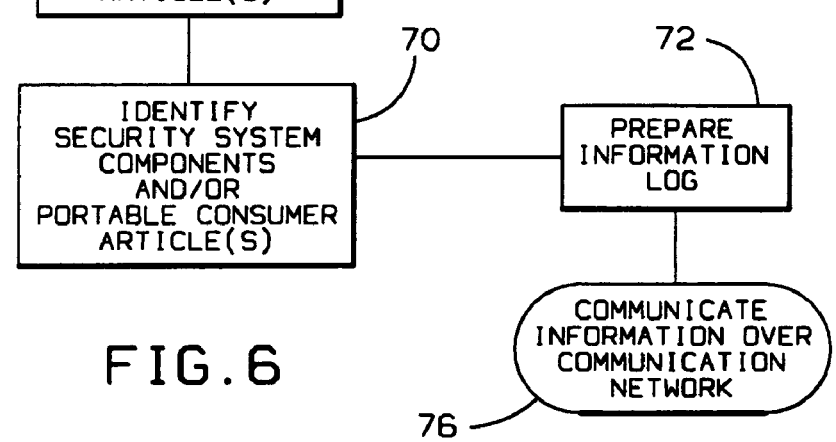
FIG. 6

NETWORKED SECURITY SYSTEM AND METHOD FOR MONITORING PORTABLE CONSUMER ARTICLES

BACKGROUND OF THE INVENTION

1. Field of the Invention

This invention relates to security systems for portable consumer articles and, more particularly, to a system for monitoring portable consumer articles from a location remote from where the articles are stored, placed for use, or displayed. The invention is also directed to a method of monitoring portable consumer articles from a remote location.

2. Background Art

Security systems for portable consumer articles continue to evolve, as do both the products that they are designed to protect and the sophistication of the individuals that abscond with such articles.

At one point in time, one way mirrors and surveillance cameras afforded an adequate deterrent to theft. As time went on, a multitude of different consumer products were developed, particularly in the electronics area, with ever increasing sophistication and reduction in size. Because of the many options afforded to potential consumers, and the significance of the investment associated with purchase, it became necessary to make these products available for inspection, handling, and operation, at point of purchase. This necessitated the monitoring of each article. One system that developed was the use of electronic article surveillance ("EAS") tags on each article, which could be detected by sensors at exit doors, if not removed or unarmed. An alternative to tagging was the connection of each article to a structure at or near a display.

This latter technology has been the primary focus of the security industry. The systems that have developed vary over a wide range in terms of both cost and sophistication. Given the potential volume of articles being monitored, the selection process for a security system often involves a balance of the costs of (a) the overall security system and (b) anticipated losses to theft using no security, or a security system of a specific type.

The simplest security systems generally involve mechanical tethers. Commonly, a metal-cored cable with a soft coating is connected between a support and an article. The range of movement of the article relative to the support is dictated by the length of the tether. Tethers are attached to the articles using a variety of different techniques, amongst which are attachment through the use of lassos, adhesives, fasteners, etc. These mechanical systems, depending upon the nature of the cable, offer a reasonable deterrent to unsophisticated thieves. However, they are inherently prone to defeat by severance or by disconnection at the support and/or article.

The above shortcomings with mechanical systems are addressed by incorporating electronic components that can sense a security breach and alert those in the display facility, as by the use of a detectable signal generator, such as an audible alarm and/or a light, etc.

The electromechanical systems that have been developed have been widely accepted in the consumer products industry. However, those designing these electromechanical systems face a number of challenges presented by both would-be thieves and the system operators.

One significant challenge to the designers of these systems is to make them "user friendly". The trend in the electronics industry has been to display a large number of a particular type of product on an island-type display. Potentially dozens of a particular type of article may be displayed in a relatively small area. The assignee herein has designed a number of systems that allow an integrated display to be set up to monitor some or all of the stations at which articles are placed and to readily identify a station at which a breach occurs through a central control at or near the display. The ability to arm the system with articles at less than all stations is a desirable feature in that there is not always a match between the number of stations for which the display is designed and the number of products to be displayed thereat.

For electronic systems to be effective, they obviously are required to be armed. In larger electronic stores, there may be a multitude of individual displays with independent security systems. A number of problems that have been experienced with these type of systems involve actions of the employees charged with the responsibility of setting them up and monitoring them.

It is not uncommon to visit an electronics store and find that an entire display has not been armed. This may be the result of many different causes. As one example, employees may not be properly trained in the system operation. Employees are often given the dual responsibilities of making sales and assuring that the alarm systems are properly set up. Particularly for commissioned personnel, oversight of the security systems may take a back seat to sales efforts.

Another condition that occurs is the malfunction of a security system at one or more stations. Rather than correct the problem, the individual sation or stations may be unarmed, making the articles thereat an easy target for thieves.

Generally, the owners of businesses at which articles are displayed have focused on individual security systems throughout the store, without appreciating the overall effectiveness of security through a more global perspective. While loss prevention specialists may orchestrate the incorporation of an effective security system at a particular facility, throughout a given day, the store personnel has the flexibility to disarm stations or entire systems at a particular display or displays without accountability. Given the high cost of miniature electronic components, thieves are constantly on the lookout for articles that can be easily absconded with. Sophisticated thieves can quickly remove such articles from displays, place them discreetly on their person, and depart from a facility without detection. Without effective security, losses, particularly at electronics stores, due to theft can be staggering. Full accounting for these losses may not be determinable until the end of an evening at the time of store closure, or during another appropriate inventorying period.

Another particularly troubling problem to the industry has been the proliferation of "inside theft". Persons authorized to operate security systems can disarm stations, displays, or storage areas, to allow undetected removal of articles. Since there is no global oversight of systems during business hours, there becomes no suspicion of vulnerability to theft until the same has already occurred and it is too late to attempt to retrieve articles taken by thieves. In a given night, any number of stations at a display, or a number of displays, may be unarmed, with little attention paid thereto. Much of this problem is attributable to the fact that the sales staff is given the responsibilities of both monitoring the displays and promoting sales. During business hours, the sales staff is highly motivated to maximize sales and is unlikely to take the time to repair, or have repaired, a down display security system. The absence of global monitoring of these systems may result in their being down not only for a given business day, but for extended periods.

There continues to be a need in the industry to better monitor the manner in which security systems at displays, and articles associated with those displays, are handled.

While the security systems have been described above in the retail establishment environment at which such articles are displayed and sold, the theft problem is not peculiar to these environments. The size and expense of these articles has translated the theft problem to other environments. As one example, in many offices, a large number of laptop computers may be used by principles and support staff. It is not practical to store laptops each night in a secure enclosure. As a result, one or more individuals might make an unauthorized entry into a facility and have access to potentially dozens of such computers.

Schools face a similar problem. Computer equipment in these institutions can be found in classrooms, labs, study areas, etc. Labs may contain other expensive scientific equipment, such as microscopes, and the like.

In stockrooms, expensive items may be temporarily stored in such a manner that they are readily accessible to potential thieves.

In short, the often exceptional economic loss due to theft of portable consumer articles has extended well beyond the area of point-of-purchase at establishments which sell consumer articles. In fact, the expense of some such items is significant enough that it is dangerous to display them even in a home environment.

The recent proliferation of small, expensive, consumer articles, particularly in the electronics area, has caused a corresponding increase in theft. Consequently, there has grown a need to monitor these portable consumer articles in very different environments, including, but not limited to, those that are commercial, residential and institutional in nature.

SUMMARY OF THE INVENTION

In one form, the invention is directed to a method of monitoring portable consumer articles at a display. The method includes the steps of: providing a first portable consumer article; providing a security system capable of interacting with the first portable consumer article and having (a) an armed state and at least one of (b) an unarmed state, (c) a breached state with respect to the first portable consumer article, and (d) a lost power state; causing the security system to generate a first signal as an incident of the security system being placed in the armed state; causing the security system to generate a second signal as an incident of the security system being placed in the unarmed state; causing the security system to generate a third signal as an incident of the security system being placed in the breached state; causing the security system to generate a fourth signal as an incident of there being a loss of power to the security system; operatively interacting the security system with the first portable consumer article; and preparing an information log of the state of the security system by monitoring the first and the at least one of the second, third, and fourth signals so that the state of the security system can be determined over a time period.

The step of preparing an information log may involve at least one of (a) preparing an information log at a site at which the security system is located and (b) transmitting the signals to a remote location and at the remote location preparing the information log.

The method may further include the step of making an identification of the first portable consumer article and correlating the identification of the first portable consumer article with other information in the information log.

In one form, the step of making an identification of the first portable consumer article involves using an identification code for the first portable consumer article and reading the code to thereby make an identification of the first portable consumer article.

The step of using an identification code may involve using a Universal Product Code.

The method may further include the step of communicating at least one of (a) the first, second, third, and fourth signals and (b) information in the information log over a communication network.

In one form, the step of communicating at least one of (a) the first, second, third, and fourth signals and (b) information in the information log involves communicating over a local area network.

The communication may take place over a telecommunication network, such as a global telecommunication network.

The method may further include the step of identifying a location of the first portable consumer article and correlating the location of the first portable consumer article with other information in the information log.

The step of operatively interacting the security system may involve interacting a first sensor with the first portable consumer article, which first sensor has a secured state and an unsecured state. The method may further include the steps of providing an identification for the first sensor and correlating the identification for the first sensor with other information in the information log.

The step of causing the security system to generate the third signal may involve causing the security system to generate the third signal as an incident of the first sensor changing from the secured state into the unsecured state.

The method may further include the step of interacting with the security system from a remote location.

The step of interacting with the security system may involve monitoring at least one of the armed, unarmed, breached, and lost power states of the security system.

In one form, the security system has changeable aspects and the step of interacting with the security system involves at least one of: (a) changing at least one of the armed, unarmed, breached, and lost power states of the security system; and (b) changing a changeable aspect of the security system other than the state of the security system.

The step of interacting with the security system may involve interacting with the security system through a personal computer.

In another form, the invention is directed to a method of monitoring portable consumer articles at a display, which method includes the steps of: providing a first portable consumer article; providing a first security system at a first location capable of interacting with the first portable consumer article and having (a) an armed state and at least one of (b) an unarmed state, (c) a breached state with respect to the first portable consumer article, and (d) a lost power state; causing the first security system to generate a first signal as an incident of the first security system being placed in the armed state; causing the first security system to generate a second signal as an incident of the first security system being placed in the unarmed state; causing the first security system to generate a third signal as an incident of the first security system being placed in the breached state; causing the first security system to generate a fourth signal as an incident of there being a loss of power to the first security system; operatively interacting the first security system with the first portable consumer article; and monitoring at least one of the armed, unarmed, breached, and lost power states from a second location remote from the first location.

In one form, the at least one of the first, second, third, and fourth signals is communicated over a local area network from the first location to the second location.

The signals may be communicated alternatively over a telecommunication network or over a global telecommunication network.

The method may further include the steps of making an identification of the first portable consumer article and determining the identification of the first portable consumer article from the second location in the event that the first security system is changed from the armed state into the breached state.

The step of making an identification of the first portable consumer article may involve using an identification code for the first portable consumer article and reading the code to thereby make an identification of the first portable consumer article.

The step of using an identification code may involve using a Universal Product Code.

The method may further include the steps of identifying a location of the first portable consumer article and determining the location of the first portable consumer article from the second location.

In one form, the step of operatively interacting the security system involves interacting a first sensor with the first portable consumer article, which first sensor has a secured state and an unsecured state. The method may further include the step of determining the state of the first sensor from the second location.

The step of causing the security system to generate the third signal may involve causing the security system to generate the third signal as an incident of the first sensor changing from the secured state into the unsecured state.

The step of interacting with the first security system may involve changing at least one of (a) the armed, unarmed, breached, and lost power states of the first security system; and (b) changing another aspect of the first security system.

The step of interacting with the first security system may involve interacting with the first security system through a personal computer.

The method may further include the steps of: providing a second portable consumer article; providing a second security system capable of interacting at a third location with the second portable consumer article and having (a) an armed state and at least one of (b) an unarmed state, (c) a breached state with respect to the first portable consumer article, and (d) a lost power state; causing the second security system to generate a fifth signal as an incident of the second security system being placed in the armed state; causing the second security system to generate a sixth signal as an incident of the second security system being placed in the unarmed state; causing the second security system to generate a seventh signal as an incident of the second security system being placed in the breached state; causing the second security system to generate an eighth signal as an incident of there being a loss of power to the second security system; operatively interacting the second security system with the second portable consumer article; and monitoring at least one of the armed, unarmed, breached, and lost power states for the second security system from the second location.

The method may further include the steps of processing at least one of the fourth, fifth, sixth, and seventh signals to generate a processed signal, and communicating the processed signal to at least one of the first location, second location, and a third location.

The step of communicating the processed signal may involve communicating the processed signal in e-mail format to the at least one of the first, second, and third locations.

The step of communicating the processed signal may involve communicating the processed signal over a telecommunication network as a text message.

The step of communicating the processed signal may involve communicating the processed signal over a global communication network to a personal computer.

In one form, the step of processing the at least one of the fifth, sixth, seventh, and eighth signals comprises processing the at least one of the fifth, sixth, seventh and eighth signals through a server.

The method may further include the step of providing a camera and causing the camera to generate a video image taken at the first location as an incident of the generation of at least one of the first, second, third and fourth signals.

The method may further include the step of causing the generation of a prompt to the second location as an incident of the generation of at least one of the first, second, third and fourth signals.

The method may further include the steps of establishing a communication link between the first security system and a web server to allow the state of the first security system to be ascertained through a Web Browser.

The method may further include the step of limiting communication between a Web Browser and first security system to authorized users.

The step of providing a first security system may involve providing a first security system with a detectable alarm generator that is at least one of audibly and visually detectable at the first location. The method may further include the step of interacting with the first security system from the second location by at least one of (a) disabling the detectable alarm generator and (b) altering a detectable alarm generated by the detectable alarm generator.

The method may further include the steps of identifying a location of the first portable consumer article and determining the location of the first portable consumer article from the second location in the event that the security system is changed from the armed state into the breached state.

In one form, the step of operatively interacting the first system involves associating a first sensor with the first portable consumer article, which sensor has a secured state and an unsecured state. The method may further include the steps of providing an identification for the first sensor and determining the identification of the first sensor from the second location in the event that the first sensor is changed from secured state into the unsecured state, which causes the first security system to be changed from the armed state into the breached state.

Th method may further include the step of communicating the identification of the first portable consumer article from the first location to facilitate recovery of the first consumer article.

The method may further include the step of causing a detectable signal to be generated at the first location as an incident of the first alarm system changing from the armed state into the breached state.

In one form, the first and third locations are within a first consumer article sales establishment and the second location is within the first consumer article sales establishment.

The first and third locations may be within a first consumer article sales establishment, with the second location being remote from the first consumer article sales establishment.

In another form, the invention is directed to a method of monitoring portable consumer articles at a display, which method includes the steps of: providing a first portable consumer article; providing a security system capable of interacting with the first portable consumer article at a first location; operatively interacting the first security system with the first portable consumer article; and interacting with the security system from a second location remote from the first location.

The step of interacting with the security system may involve monitoring the security system.

In one form, the security system has at least one changeable aspect and the step of interacting with the security system involves changing the at least one changeable aspect of the security system from the second location.

The invention is further directed to the combination of a first portable consumer article; a first security system; and a communication network. The first security system operatively interacts with the first portable consumer article at a first location and has (a) an armed state, and at least one of (b) an unarmed state, (c) a breached state, and (d) a lost power state. Through the communication network, the state of the first security system can be monitored from a second location, remote from the first location.

In one form, the first security system causes the generation of a first signal that is transmitted over the communication network as an incident of the first security system changing from the armed state into the breached state with the first security system operatively interacting with the first portable consumer article.

The first security system may cause the generation of a signal that is transmitted over the communication network with the first security system in the armed state, the unarmed state, and/or the lost power state.

The communication network may be a local area network, a telecommunication network, or a global communication network.

The combination may additionally include a personal computer at the second location through which a state of the security system is monitored through the communication network.

The combination may further include a first communication device at the second location in communication with the first security system from the second location.

In one form, the first portable consumer article has an identification that is determined by the first communication device through the communication network.

In one form, the first communication device is at least one of (a) a personal computer; (b) a telephone; (c) a pager; and (d) a text message display device.

In one form, the identification of the first portable consumer article includes a Universal Product Code and the first security system has a reader for identifying the first portable consumer article through the Universal Product Code.

In one form, the first portable consumer article has a location that is determined by the first communication device through the communication network.

In one form, the first security system includes a first sensor that has (a) a secured state attached to the first portable consumer article and (b) an unsecured state with the first sensor either (i) separated from the first portable consumer article or (ii) altered in configuration.

In one form, the first sensor and first portable consumer article each have an identification and the identification of the first sensor and the first portable consumer article can be determined through the first communication device with the first security system in the breached state.

In one form, the location of the first portable consumer article can be identified through the first communication device with the first security system in the breached state.

In one form, the first communication device is capable of changing the state of the first security system through the communication network.

The combination may further include a logging system for generating an information log through which the state of the first security system can be determined over a time period.

In one form, the information log includes an identification of the first portable consumer article and an identification of a location for the first portable consumer article.

In one form, the first security system has a first sensor interacted with the first portable consumer article and having a secured state and an unsecured state. The first sensor has an identification that is included in the information log.

The combination may further include a web server.

In one form, the first security system has a first generator for a detectable signal at the first location, and the first generator is activated as an incident of a changing of the state of the first security system.

The combination may further include a server, with the first security system further including a first communication device. The first security system generates a first signal to the first signal generator as an incident of a changing of the state of the first security system. The first security system communicates with the server and the sever communicates with the first communication device.

The server may be a web server.

The combination may further include a camera that generates a video image of the first location to the second location.

In one form, the combination includes a camera that is activated to generate a video image of the first location to the second location as an incident of the first security system changing from the armed state into the breached state with the first security system operatively interacting with the first portable consumer article.

The combination may further include a second portable consumer article and a second security system operatively interacting with the second portable consumer article at a third location and having (a) an armed state and at least one of (b) an unarmed state, (c) a breached state, and (d) a lost power state. The state of the second security system can be monitored from the second location.

In one form, the first and third locations are in a first consumer article sales establishment and the second location is also within the first consumer article sales establishment.

The first and third locations may be in a first consumer article sales establishment, with the second location remote from the first consumer article sales establishment.

Alternatively, the first location is in a first consumer article sales establishment, the third location is in a second consumer article sales establishment remote from the first article sales establishment, and the second location is remote from the first and second consumer article sales establishments.

BRIEF DESCRIPTION OF THE DRAWINGS

FIG. 1 is a schematic representation of a security system, according to the present invention, interacting with a plurality of portable consumer articles, and linked with a communication network through which the security system can be monitored, and aspects thereof potentially changed, through a remote communication device;

FIG. 2 is a schematic representation of a plurality of the security systems linked to the communication device through a local area network;

FIG. 3 is a view as in FIG. 2 wherein the security systems are linked to one or more communication devices through the local area network and through a telecommunication/global network via a server, such as a web server;

FIG. 4 is a schematic representation of one method of monitoring portable consumer articles, according to the present invention;

FIG. 5 is a view as in FIG. 4 of another method of monitoring portable consumer articles, according to the present invention; and FIG. 6 is a view as in FIGS. 4 and 5 of a still further method of monitoring portable consumer articles, according to the present invention.

DETAILED DESCRIPTION OF THE DRAWINGS

The present invention is concerned with the monitoring of "portable consumer articles". The term "portable consumer article", as used herein, is intended to encompass virtually any article that is used for business or pleasure by persons of any age. The consumer article is considered "portable", as used herein, if it is movable by a potential thief from a location at which the portable object is "displayed". The articles range from being as small as jewelry to as large as motor vehicles, or the like. The focus herein will be on portable articles that are generally small enough to be concealed on the person of a thief, or at least carried, as by a container, by such person or persons without ready detection. Exemplary articles will be described generally herein as scientific equipment or electronic equipment, with the understanding that these articles are exemplary in nature only.

Additionally, for purposes of simplicity, throughout the description and claims herein, reference will be made to a "display". This language is intended to encompass not only what is technically characterized as a display, such as at point of purchase in a consumer article sales establishment, but virtually any location at which portable consumer articles are stored or placed, either temporarily or permanently, in a manner that they are visible and/or accessible. For example, a microscope in an institutional laboratory will be considered to be "at/on a display". Laptops located on a desk in an office or on a counter top in a home will considered herein to be "at/on a display". Articles stacked in a storeroom, on a floor, on shelves, in any environment in a manner so as to be accessible, will be considered herein to be "at/on a display".

Referring initially to FIG. 1, a security system, according to the present invention, is shown at 10 for monitoring at least one, and in this case a plurality of, portable consumer articles 12,12'.

The security system 10 incorporates a number of components that are currently used in the prior art and of various designs well known to those skilled in this industry. These components come in myriad different forms. The specific details thereof, however, are not critical to the present invention. For example, the security system 10 incorporates at least one, and in this case two, sensors 14,14', operatively associated one each with the portable consumer articles 12,12'. The operative interaction between the sensors 14,14' and portable consumer articles 12,12' may be effected through a wired or wireless interaction. One common construction for such sensors 14,14' is shown in U.S. Pat. No. 5,341,124, which is incorporated herein by reference.

As shown in that patent, each of the sensors 14,14' is mechanically attached to articles and has an associated actuator. By repositioning the actuator, the sensors 14,14' are selectively placed in a secured state and in an unsecured state. The secured state is maintained with the sensors 14,14' affixed to the portable consumer articles 12,12'. By removing the sensors 14,14' from the associated portable consumer article 12,12', or by altering the sensor configuration, as by severing a conductive element, which defines a part of a circuit path between the sensors 14,14' and a controller 16, the sensors 14,14' are changed from the secured state into the unsecured state.

The controller 16 is designed to monitor the state of the sensors 14,14'. With the sensors 14,14' in the secured state, the controller 16 can be set to change the security system 10 from an unarmed state into an armed state. In the armed state for the security system 10, a change in state of either sensor 14,14' from the secured state into the unsecured state will be detected by the controller 16, which thereby causes a detectable signal generator 18 to be activated to alert an individual in the vicinity of the security system 10 that there has been a security breach.

The controllers 16 may vary in terms of their level of sophistication. The assignee herein offers a wide range of controllers 16, certain of which have displays 20 to facilitate system setup and also identify specific sensors 14,14' that have been breached. This feature facilitates monitoring, and it is particularly desirable for displays at consumer article sales establishments, and the like, at which there are a large number of portable consumer articles 12,12' that are being monitored.

Also, to facilitate operation and monitoring, as shown on the exemplary sensor 14, an LED 22 may be used to monitor the state of that sensor 14 and/or give a visual indication as to the state of the overall security system 10, i.e., whether it is in the armed or unarmed states.

The security system 10, with the components described above, is generally designed to monitor portable consumer articles 12,12' in a relatively small areal location. However, as shown in U.S. Pat. No. 5,341,124, various splitting components can be used to expand the capacity of the security system 10. With the components heretofore described, the security system 10 is effective in alerting individuals to a breach only within an area in which the signal developed by the signal generator 18 can be detected. In the event that an audible signal is generated, the volume of the generated sound will dictate range. In the event that the signal is only visible, the effective alerting range is limited to an area within line of sight of the particular visible signal.

As a practical matter, the components described above are generally utilized at point of purchase displays at a single "island", as typically used in consumer article sales establishments for a particular type of product. Thus, independent security systems 10 are commonly used throughout the sales establishment at different display "islands" at which different types of products are placed.

As noted above, the location of the security system 10 is not intended to be environmentally limited. For example, the security system 10 may be used in a open showroom, in a home, in an office, in an institutional environment, in a storeroom, etc.

According to the invention, remote interaction with the security system 10 is contemplated. This interaction may be in the nature of monitoring the security system 10, or active interaction by changing some aspect/state of the security system 10 from a remote location.

Generally, there are four principal states for the security system that are monitored. First of all, a supervisor will want to know whether the security system 10 is in an armed state or an unarmed state. The armed and unarmed states apply potentially to the security system 10 as a whole and/or to each of the individual sensors 14,14'. For example, most security systems incorporate the ability to operate with less than all of the available sensors 14,14' operatively associated with a portable consumer article 12,12' and in a secured state with respect thereto and armed. The sensors 14,14' may alternatively be operatively associated with a portable consumer article 12,12', but for some reason they may not be armed.

The security system 10 also has a breached state resulting from the aforementioned tampering with the sensor 14 that is operatively associated with a portable consumer article 12,12', in the secured state, and armed. Tampering may be by removal of the sensor 14,14' from the associated portable consumer article 12,12', or the severance of a conductive wire associated therewith, or otherwise.

Another state for the security system that is commonly monitored is a lost power state. The security system 10 has a power supply 24, which in this case is shown separate from the security system. For example, the power supply may be a 110 volt or 220 volt supply. Alternatively, the power supply can be self-contained with the security system 10, such as by using batteries, or the like.

According to the invention, a communication device 26 is provided at a location spaced from the location of the security system 10. There is either one way or two way communication contemplated between the communication device 26 and the security system 10, via a communication network 28. The controller 16 may include a processor 30, through which signals, representative of the state, or some other aspect of the security system 10, can be communicated over the communication network 28 to the communication device 26.

As shown in FIG. 2, the communication network 28 may include a local area network 32. In this case, the local area network 32 incorporates a hub 34 with which the controller 16 communicates. In FIG. 2, a like security system 10', with a controller 16', is linked to the local area network 32 via the hub 34. In this embodiment, the separate security systems 10,10' may be in the same room, in different rooms, on different floors, in different buildings, etc. The local area network 32 communicates with the communication device 26, which may be at a central security station in a store, an educational institution or at a convenient monitoring location in a home.

The communication device 26 may take a wide range of different forms. As one example, the communication device 26 may be a personal computer, or any device through which either monitoring information, such as the state of either security system 10,10' can be communicated to an individual, and/or through which active interaction of the individual or individuals with the security systems 10,10' can be carried out.

In FIG. 3, the security systems 10,10' are shown in communication with the local area network 32. Additionally, the hub 34 is linked to a server 36, which in turn is linked to communication devices 26,26',26". The single communication device 26 can be utilized, or alternatively additional communication to the devices 26',26" shown, can be utilized. One or more of the communication devices 26,26',26" can be on the site of the security systems 10,10', or at a remote location. The server 36 is linked to the communication devices 26,26',26", as by a telecommunication/global network 38 that makes up part of the communication network 28, previously described. The telecommunication network 38 could be fixed, or wireless, with an analog or digital network. It is preferred to have access to a global communication network, such as the Internet. This facilitates worldwide interaction between the communication devices 26,26',26" and the security systems 10,10".

As shown in FIG. 3, the security systems 10,10' may be in the same or different buildings. For example, a chain store may wish to monitor multiple store locations. The security system 10 may be in one consumer article sales establishment, with the other security system 10' being in a separate consumer article sales establishment. Worldwide, coordinated interaction between the communication devices 26,26', 26" and the security systems 10,10' can be accomplished.

The nature of the communication devices, as previously noted, can vary considerably. A personal computer can be used to receive monitoring information and send commands to actively interact with the security systems 10,10'. Alternatively, one or more of the communication devices 26,26',26" may be a receiver that will merely accept a prompt, indicative potentially of a change of state of one or more of the security systems 10,10'. The individual receiving the prompt may then initiate appropriate action to address the potential problem associated with the security system(s) 10,10'.

As a further alternative, the individual monitoring the security systems 10,10' may receive an e-mail message on a personal computer or on a handheld device, such as a pager or telephone. A text message may describe specific system states or conditions, which may necessitate action on that individual's part.

In short, the communication devices 26,26',26" may be any, of a wide range, of currently available devices to receive alerting information, and potentially to send appropriate commands back through the communication network 28 to effect any necessary changes in the state, or some aspect, of the security systems 10,10'.

The invention contemplates that very specific security system information may also be communicated to the communication devices 26,26',26". For example, each security system 10,10' and/or associated controller 16,16' may have a specific identification. Each of the associated sensors 14,14' may have its own specific identification. Additionally, each portable consumer article 12,12' may likewise have its own specific identification. In the case of the security system 10,10'/controller 16,16', the identification may be as to a specific store and more particularly a precise location in a particular store. The controllers 16,16' may be programmed so that in the event of a breach of either security system 10,10', specific usable information is conveyed as to the breach. For example, as shown in FIG. 1, if the sensor 14' is tampered with, with the security system 10 in the armed state, the controller 16 may cause a signal to be generated over the communication network 28 to the communication device 26 that gives (a) the specific location of the security system 10, as by locale, building, room, etc., (b) the identification of the sensor 14', and (c) additionally the identification of the portable consumer article 12' with which the sensor 14' is operatively associated. The individual monitoring the security system 10, from either a local or remote location, can instantaneously become aware of precisely what the portable consumer article 12' is and at what location it was "displayed".

To facilitate programming of the controller 16 to accomplish the above identification, exemplary portable consumer article 12' has a code 40 associated therewith that can be used to identify the precise nature of the portable consumer article 12 to the controller 16. The code 40 may be a readable UPC bar code. To facilitate its programming, the security system 10 in FIG. 1 may incorporate a code reader 42 that will scan the code 40 and instantaneously program the controller 16 to precisely identify the portable consumer article 12' that is associated with the sensor 14'.

As shown additionally in FIG. 1, one or more cameras 44,44' can be utilized in conjunction with the security system 10. In the event of the detection of a breach in the security system 10 by the controller 16, the controller 16 may generate a signal to one or both of the cameras 44,44' to generate visual images for review either locally or remotely through its communication device 26. Several options are available for the use of the cameras 44,44'. For example, the single camera 44 can be utilized in the event that the portable consumer articles 12,12' are in the same general area. Once the breach signal is detected by the controller 16, the controller 16 communicates with the camera 44 to cause the camera 44 to be directed at the site of the breach. The camera 44 may be normally "on" or "off" with its activation triggered by the breach.

Alternatively, one of the cameras 44 may be focused on the portable consumer article 12, with the other camera 44' focused on the portable consumer article 12'.

Another aspect of the invention, as shown in FIG. 1, is the provision of a logging system 46, which monitors the security system 10 and generates an information log that can be reviewed to track the state of the security system 10 and/or keep a record of other operating aspects thereof over a given time period. The logging may be continuous or triggered as by a change in some aspect of the system, i.e., a breach. The logging system 46 is shown in communication with the controller 16 and the security system 10 to permit generation of an information log with the desired information. The logging system 46 may be in direct communication with the communication network 28 or may do so through the controller. Thus, the information log may be reviewable on site and/or at a remote location, as through the communication device 26. The logging information may be coordinated with images generated by the cameras 44,44'.

As noted above, the invention contemplates that the security system 10 in FIG. 1 may cause the generation of signals representative of the four above-noted states of the security system 10. It is preferable that the security system 10 causes generation of a signal that is transmitted over the communication network 28 in the event that the security system is changed from the armed state into the breached state. However, it is also contemplated that active interaction may take place via only one way communication from the communication device 26 to the security system 10 through the communication network 28. The first communication device 26 may be operated strictly to monitor the states of the security system 10, or may be operable to change the state of the security system 10 or change some other aspect of the security system 10.

As just examples of this latter function, the volume of the signal generated by the detectable signal generator 18 may be alterable through the communication device 26 from a remote location. The signal generator 18 may be disabled. Alternatively, individual sensors 14,14' may be armed or disarmed selectively from the remote location through the communication device 26. Virtually any function, state, or aspect of the security system 10 may be alterable through the communication device 26.

The invention contemplates that any number of security systems may be utilized at a single location and/or at multiple locations. Each security system may monitor a multitude of portable consumer articles. The security systems 10,10' may be operable in an isolated mode, without communication with the local area network 32, in communication with the local area network 32 but not with the telecommunication/global network 38, or through the telecommunication/global network 38.

One method of monitoring portable consumer articles, at a "display", according to the present invention, is shown in flow diagram form in FIG. 4. As noted above, "at a display" is intended to mean at a commercial establishment, an institutional environment, a residence, etc. As shown at block 50, one or more portable consumer articles are provided. As shown at block 52, a security system is provided that is capable of interacting with the portable consumer article(s) at a first location. As shown in block 53, the security system is interacted with from a second location.

The interaction contemplated at block 53 may be monitoring of the security system from the second location. Alternatively, the interaction may involve changing at least one changeable aspect of the security system from the second location.

Another method of monitoring portable consumer articles, according to the present invention, is shown in FIG. 5. As shown at block 54, at least one portable consumer article is provided. As shown at block 56, a security system is provided that is capable of interacting with the portable consumer article and having (a) an armed state and at least one of (b) an unarmed state, a breached state with respect to the portable consumer article, and (d) a lost power state. As shown at block 58, the security system is caused to generate different signals indicative of the state of the security system. A first signal is generated as an incident of the security system being placed in the armed state, a second signal with the security system in the unarmed state, a third signal with the security system in the breached state, and a fourth signal as an incident of there being a loss of power to the security system. As shown at block 60, the security system is operatively interacted with the portable consumer article(s). As shown at block 62, an information log of the state of the security system is prepared by monitoring the first and the at least one of the second, third, and four signals, so that the state of the security system can be determined/tracked over a time period.

The information log may be prepared at a site at which the security system is located or, alternatively, by transmitting signals to a remote location at which the information log is prepared.

In FIG. 6, a modified form of the inventive monitoring method is shown. Portable consumer article(s) and a security system are provided, as shown at blocks 64,66, respectively, corresponding to the steps at blocks 54,56 in FIG. 5. The security system is operatively interacted with the portable articles, as shown at block 68, which corresponds to the same steps shown at block 60 in FIG. 5. At block 70, identification is made of at least one of the system components and/or the portable consumer articles. This identification information is used in preparing the information log, shown at block 72, which step corresponds to the step shown at block 62 in FIG. 5. The identifications are correlated with other information in the information log.

As examples, the first portable consumer article may be identified very specifically, as by a conventional UPC code. This identification may be made by reading code through a scanner for processing by the security system. The associated sensors and the locations for each portable consumer article can be likewise identified and correlated with other information in the log.

As shown in blocks 74,76, in FIGS. 5 and 6, respectively, information relative to the security system is communicated over a communication network. As shown in FIG. 5, communicated information may be the signals generated by the security system representative of the state thereof, and/or information in the information log.

The information may be communicated over a local area network, a telecommunication network and/or a global communication network.

The information may be specific as to any aspect of the security system, and its state. For example, the information may relate to the state of any sensor, i.e., the changing of the sensor from a secured state into a unsecured state.

With the invention, the system state, and potentially all other aspects of the security system, can be monitored and potentially changed from the location remote from where the security system is located.

The method contemplates use of a single security system, or networking of any number of security systems that have the same or different constructions.

As shown in FIG. 1, an authorization system 90 may be incorporated to avoid unauthorized access to the communication network 28 across the security system 10, as through a Web Browser 92. This additional optional step is shown at block 94 in FIG. 4.

As previously noted, the information is communicated over the communication network, as in e-mail format, to a personal computer, a cellular telephone, a pager, etc.

By utilizing the inventive concepts, monitoring and control of individual and/or networked security systems can be carried out potentially from any local remote location on a worldwide basis. The specific identification of the portable consumer articles being monitored facilitates inventorying in commercial establishments. At the same time, by having the ability to remotely identify the nature of an article that has been tampered with or stolen, specific instructions can be given to security personnel in the monitored locale to be on the lookout for a very specific article. This increases the likelihood that a thief can be caught either on premises or soon after his/her exit from the premises.

The monitoring and active interaction contemplated make the invention valuable not only from the standpoint of controlling outside theft but also by reason of facilitating the control of internal theft. A loss prevention supervisor can determine, from a remote location, whether or not the security systems are properly armed. In the event that a sensor associated with a particular portable consumer article is not armed, steps can be taken to investigate why the arming has not occurred and/or to affect arming if that particular sensor or an overall system with which that sensor is associated. The logging capability allows the history of each portable consumer article to potentially be tracked. Video images can be used to identify the individual(s) responsible for any change in a system, be it arming the same, changing the state thereof, changing settings thereon, etc.

The invention contemplates that a user identification system, as shown at 100 in FIG. 1, can be used. The user identification system 100 may prohibit any change in any aspect of the system 10 without appropriate identification of an authorized user. By correlating the user identity to other logged information, the history of the setup and operation of the security system 10 can be traced to a particular individual. Authorized users may thus be held accountable for any losses due to a mismanagement of the security system. For example, if a specific user is responsible for the security system 10, any losses due to improper setup may be attributed to that particular user. System breakdowns may be tracked and may dictate repair or reconstruction of a system, or additional training and/or supervision of personnel to minimize future losses.

While the invention has been described with particular reference to the drawings, it should be understood that various modifications could be made without departing from the spirit and scope of the present invention.

The invention claimed is:

1. A method of monitoring portable consumer articles at a display, the method comprising the steps of:
providing a first portable consumer article;
providing a security system capable of interacting with the first portable consumer article and having (a) an armed state and at least one of (b) an unarmed state, (c) a breached state with respect to the first portable consumer article, and (d) a lost power state;
causing the security system to generate a first signal as an incident of the security system being placed in the armed state;
causing the security system to generate a second signal as an incident of the security system being placed in the unarmed state;
causing the security system to generate a third signal as an incident of the security system being placed in the breached state;
causing the security system to generate a fourth signal as an incident of there being a loss of power to the security system;
operatively interacting the security system with the first portable consumer article; and
preparing an information log of the state of the security system by monitoring the first and at least one of the second, third, and fourth signals so that the state of the security system can be determined over a time period.

2. The method of monitoring portable consumer articles at a display according to claim 1 wherein the step of preparing an information log comprises at least one of (a) preparing an information log at a site at which the security system is located and (b) transmitting the signals to a remote location and at the remote location preparing the information log.

3. The method of monitoring portable consumer articles at a display according to claim 1 further comprising the step of making an identification of the first portable consumer article and correlating the identification of the first portable consumer article with other information in the information log.

4. The method of monitoring portable consumer articles at a display according to claim 3 wherein the step of making an identification of the first portable consumer article comprises the steps of using an identification code for the first portable consumer article and reading the code to thereby make an identification of the first portable consumer article.

5. The method of monitoring portable consumer articles at a display according to claim 4 wherein the step of using an identification code comprises using a Universal Product Code.

6. The method of monitoring portable consumer articles at a display according to claim 3 further comprising the step of identifying a location of the first portable consumer article and correlating the location of the first portable consumer article with other information in the information log.

7. The method of monitoring portable consumer articles at a display according to claim 6 wherein the step of operatively interacting the security system comprises interacting a first sensor with the first portable consumer article, which first sensor has a secured state and an unsecured state, and further comprising the steps of providing an identification for the first sensor and correlating the identification for the first sensor with other information in the information log.

8. The method of monitoring portable consumer articles at a display according to claim 7 wherein the step of causing the security system to generate the third signal comprises causing the security system to generate the third signal as an incident of the first sensor changing from the secured state into the unsecured state.

9. The method of monitoring portable consumer articles at a display according to claim 1 further comprising the step of communicating at least one of (a) at least one of the first, second, third, and fourth signals and (b) information in the information log over a communication network.

10. The method of monitoring portable consumer articles at a display according to claim 9 wherein the step of communicating at least one of (a) at least one of the first, second, third, and fourth signals and (b) information in the information log comprises communicating over a local area network.

11. The method of monitoring portable consumer articles at a display according to claim 9 wherein the step of communicating at least one of (a) at least one of the first, second, third, and fourth signals and (b) information in the information log comprises communication over a telecommunication network.

12. The method of monitoring portable consumer articles at a display according to claim 9 wherein the step of communicating at least one of (a) at least one of the first, second, third, and fourth signals and (b) information in the information log comprises communication over a global telecommunication network.

13. The method of monitoring portable consumer articles at a display according to claim 1 further comprising the step of interacting with the security system from a remote location.

14. The method of monitoring portable consumer articles at a display according to claim 13 wherein the step of interacting with the security system comprises monitoring at least one of the armed, unarmed, breached, and lost power states of the security system.

15. The method of monitoring portable consumer articles at a display according to claim 13 wherein the security system has changeable aspects and the step of interacting with the security system comprises at least one of: (a) changing at least one of the armed, unarmed, breached, and lost power states of the security system; and (b) changing a changeable aspect of the security system other than the state of the security system.

16. The method of monitoring portable consumer articles at a display according to claim 13 wherein the step of interacting with the security system comprises interacting with the security system through a personal computer.

17. A method of monitoring portable consumer articles at a display, the method comprising the steps of:
providing a first portable consumer article;
providing a first security system at a first location capable of interacting with the first portable consumer article and having (a) an armed state and at least one of (b) an unarmed state, (c) a breached state with respect to the first portable consumer article, and (d) a lost power state;
causing the first security system to generate a first signal as an incident of the first security system being placed in the armed state;
causing the first security system to generate a second signal as an incident of the first security system being placed in the breached state;
causing the first security system to generate a third signal as an incident of there being a loss of power to the first security system;
operatively interacting the first security system with the first portable consumer article; and
preparing an information log of the state of the security system by monitoring at least one of the armed, breached, and lost power states so that the state of the security system can be determined over a time period.

18. The method of monitoring portable consumer articles at a display according to claim 17 further comprising the step of communicating at least one of the first, second, and third signals over a local area network from the first location to a second location remote from the first location.

19. The method of monitoring portable consumer articles at a display according to claim 17 wherein the step of communicating at least one of the first, second, and third signals comprises communicating over a telecommunication network.

20. The method of monitoring portable consumer articles at a display according to claim 17 wherein the step of communicating at least one of the first, second, and third signals comprises communicating over a global telecommunication network.

21. The method of monitoring portable consumer articles at a display according to claim 17 further comprising the steps of making an identification of the first portable consumer article and determining the identification of the first portable consumer article from a second location, remote from the first location, in the event that the first security system is changed from the armed state into the breached state.

22. The method of monitoring portable consumer articles at a display according to claim 21 wherein the step of making an identification of the first portable consumer article comprises the steps of using an identification code for the first portable consumer article and reading the code to thereby make an identification of the first portable consumer article.

23. The method of monitoring portable consumer articles at a display according to claim 22 wherein the step of using an identification code comprises using a Universal Product Code.

24. The method of monitoring portable consumer articles at a display according to claim 17 wherein the security system has changeable aspects and the step of interacting the first security system with the first portable consumer article comprises at least one of: (a) changing at least one of the armed, unarmed, breached, and lost power states of the first security system; and (b) changing a changeable aspect of the security system other than the state of the security system.

25. The method of monitoring portable consumer articles at a display according to claim 24 wherein the step of interacting the first security system with the first portable consumer article comprises interacting the first security system with the first portable consumer article through a personal computer.

26. The method of monitoring portable consumer articles at a display according to claim 17 further comprising the steps of providing a second portable consumer article; providing a second security system capable of interacting at a third location with the second portable consumer article and having (a) an armed state and at least one of (b) an unarmed state, (c) a breached state with respect to the first portable consumer article, and (d) a lost power state; causing the second security system to generate a fourth signal as an incident of the second security system being placed in the armed state; causing the second security system to generate a fifth signal as an incident of the second security system being placed in the unarmed state; causing the second security system to generate a sixth signal as an incident of the second security system being placed in the breached state; causing the second security system to generate an seventh signal as an incident of there being a loss of power to the second security system; operatively interacting the second security system with the second portable consumer article; and monitoring at least one of the armed, unarmed, breached, and lost power states for the second security system from a second location remote from the first location.

27. The method of monitoring portable consumer articles at a display according to claim 26 further comprising the steps of processing at least one of the fourth, fifth, sixth, and seventh signals to generate a processed signal and communicating the processed signal to at least one of the first location, second location, and third location.

28. The method of monitoring portable consumer articles at a display according to claim 27 wherein the step of communicating the processed signal comprises communicating the processed signal in e-mail format to the at least one of the first, second, and third locations.

29. The method of monitoring portable consumer articles at a display according to claim 27 wherein the step of communicating the processed signal comprises communicating the processed signal over a telecommunication network as a text message.

30. The method of monitoring portable consumer articles at a display according to claim 26 further comprising the step of causing the generation of a prompt to the second location as an incident of the generation of at least one of the fourth, fifth, sixth, and seventh signals.

31. The method of monitoring portable consumer articles at a display according to claim 17 further comprising the step of causing the generation of a prompt to a second location as an incident of the generation of at least one of the first, second, and third signals.

32. The method of monitoring portable consumer articles at a display according to claim 17 wherein the step of providing a first security system comprises providing a first security system with a detectable alarm generator that is at least one of audibly and visually detectable at the first location and further comprising the step of interacting with the first security system from a second location by at least one of (a) disabling the detectable alarm generator and (b) altering a detectable alarm generated by the detectable alarm generator.

33. The method of monitoring portable consumer articles at a display according to claim 17 further comprising the step of causing a detectable signal to be generated at the first location as an incident of the first security system changing from the armed state into the breached state.

34. A method of monitoring portable consumer articles at a display, the method comprising the steps of:
providing a first portable consumer article;
providing a first security system at a first location capable of interacting with the first portable consumer article and having (a) an armed state and at least one of (b) an unarmed state, (c) a breached state with respect to the first portable consumer article, and (d) a lost power state;
causing the first security system to generate a first signal as an incident of the first security system being placed in the armed state;
causing the first security system to generate a second signal as an incident of the first security system being placed in the unarmed state;
causing the first security system to generate a third signal as an incident of the first security system being placed in the breached state;
causing the first security system to generate a fourth signal as an incident of there being a loss of power to the first security system;
operatively interacting the first security system with the first portable consumer article;
monitoring at least one of the armed, unarmed, breached, and lost power states from a second location remote from the first location;
identifying a location of the first portable consumer article; and
determining the location of the first portable consumer article from the second location.

35. The method of monitoring portable consumer articles at a display according to claim 34 wherein the step of operatively interacting the security system comprises interacting a first sensor with the first portable consumer article, which first sensor has a secured state and an unsecured state, and further comprising the step of determining the state of the first sensor from the second location.

36. The method of monitoring portable- consumer articles at a display according to claim 35 wherein the step of causing the security system to generate the third signal comprises causing the security system to generate the third signal as an incident of the first sensor changing from the secured state into the unsecured state.

37. A method of monitoring portable consumer articles at a display, the method comprising the steps of:
providing a first portable consumer article;
providing a first security system at a first location capable of interacting with the first portable consumer article and having (a) an armed state and at least one of (b) an unarmed state, (c) a breached state with respect to the first portable consumer article, and (d) a lost power state;
causing the first security system to generate a first signal as an incident of the first security system being placed in the armed state;
causing the first security system to generate a second signal as an incident of the first security system being placed in the unarmed state;
causing the first security system to generate a third signal as an incident of the first security system being placed in the breached state;
causing the first security system to generate a fourth signal as an incident of there being a loss of power to the first security system;
operatively interacting the first security system with the first portable consumer article;
monitoring at least one of the armed, unarmed, breached, and lost power states from a second location remote from the first location;
providing a second portable consumer article;
providing a second security system capable of interacting at a third location with the second portable consumer article and having (a) an armed state and at least one of (b) an unarmed state, (c) a breached state with respect to the first portable consumer article, and (d) a lost power state;
causing the second security system to generate a fifth signal as an incident of the second security system being placed in the armed state;
causing the second security system to generate a sixth signal as an incident of the second security system being placed in the unarmed state;
causing the second security system to generate a seventh signal as an incident of the second security system being placed in the breached state;
causing the second security system to generate an eighth signal as an incident of there being a loss of power to the second security system;
operatively interacting the second security system with the second portable consumer article;
monitoring at least one of the armed, unarmed, breached, and lost power states for the second security system from the second location;
processing at least one of the fifth, sixth, seventh, and eighth signals to generate a processed signal; and
communicating the processed signal to at least one of the first location, second location, and third location,
wherein the step of communicating the processed signal comprises communicating the processed signal over a global communication network to a personal computer.

38. A method of monitoring portable consumer articles at a display, the method comprising the steps of:

providing a first portable consumer article;

providing a first security system at a first location capable of interacting with the first portable consumer article and having (a) an armed state and at least one of (b) an unarmed state, (c) a breached state with respect to the first portable consumer article, and (d) a lost power state;

causing the first security system to generate a first signal as an incident of the first security system being placed in the armed state;

causing the first security system to generate a second signal as an incident of the first security system being placed in the unarmed state;

causing the first security system to generate a third signal as an incident of the first security system being placed in the breached state;

causing the first security system to generate a fourth signal as an incident of there being a loss of power to the first security system;

operatively interacting the first security system with the first portable consumer article;

monitoring at least one of the armed, unarmed, breached, and lost power states from a second location remote from the first location;

providing a second portable consumer article;

providing a second security system capable of interacting at a third location with the second portable consumer article and having (a) an armed state and at least one of (b) an unarmed state, (c) a breached state with respect to the first portable consumer article, and (d) a lost power state;

causing the second security system to generate a fifth signal as an incident of the second security system being placed in the armed state;

causing the second security system to generate a sixth signal as an incident of the second security system being placed in the unarmed state;

causing the second security system to generate a seventh signal as an incident of the second security system being placed in the breached state;

causing the second security system to generate an eighth signal as an incident of there being a loss of power to the second security system;

operatively interacting the second security system with the second portable consumer article;

monitoring at least one of the armed, unarmed, breached, and lost power states for the second security system from the second location;

processing at least one of the fifth, sixth, seventh, and eighth signals to generate a processed signal; and communicating the processed signal to at least one of the first location, second location, and third location, wherein thestep of processing the at least one of the fifth, sixth, seventh, and eighth signals comprises processing the at least one of the fifth, sixth, seventh and eighth signals through a server.

39. A method of monitoring portable consumer articles at a display, the method comprising the steps of:

providing a first portable consumer article;

providing a first security system at a first location capable of interacting with the first portable consumer article and having (a) an armed state and at least one of (b) an unarmed state, (c) a breached state with respect to the first portable consumer article, and (d) a lost power state;

causing the first security system to generate a first signal as an incident of the first security system being placed in the armed state;

causing the first security system to generate a second signal as an incident of the first security system being placed in the unarmed state;

causing the first security system to generate a third signal as an incident of the first security system being placed in the breached state;

causing the first security system to generate a fourth signal as an incident of there being a loss of power to the first security system;

operatively interacting the first security system with the first portable consumer article;

monitoring at least one of the armed, unarmed, breached, and lost power states from a second location remote from the first location;

providing a camera; and causing the camera to generate a video image taken at the first location as an incident of the generation of at least one of the first, second and third signals.

40. A method of monitoring portable consumer articles at a display, the method comprising the steps of:

providing a first portable consumer article;

providing a first security system at a first location capable of interacting with the first portable consumer article and having (a) an armed state and at least one of (b) an unarmed state, (c) a breached state with respect to the first portable consumer article, and (d) a lost power state;

causing the first security system to generate a first signal as an incident of the first security system being placed in the armed state;

causing the first security system to generate a second signal as an incident of the first security system being placed in the unarmed state;

causing the first security system to generate a third signal as an incident of the first security system being placed in the breached state;

causing the first security system to generate a fourth signal as an incident of there being a loss of power to the first security system;

operatively interacting the first security system with the first portable consumer article;

monitoring at least one of the armed, unarmed, breached, and lost power states from a second location remote from the first location; and establishing a communication link between the first security system and a Web server to allow the state of the first security system to be ascertained through a Web Browser.

41. The method of monitoring portable consumer articles at a display according to claim 40 further comprising the step of limiting communication between a Web Browser and the first security system to authorized users.

42. A method of monitoring portable consumer articles at a display, the method comprising the steps of:

providing a first portable consumer article;

providing a first security system at a first location capable of interacting with the first portable consumer article and having (a) an armed state and at least one of (b) an unarmed state, (c) a breached state with respect to the first portable consumer article, and (d) a lost power state;

causing the first security system to generate a first signal as an incident of the first security system being placed in the armed state;

causing the first security system to generate a second signal as an incident of the first security system being placed in the unarmed state;
causing the first security system to generate a third signal as an incident of the first security system being placed in the breached state;
causing the first security system to generate a fourth signal as an incident of there being a loss of power to the first security system;
operatively interacting the first security system with the first portable consumer article;
monitoring at least one of the armed, unarmed, breached, and lost power states from a second location remote from the first location;
making an identification of the first portable consumer article;
determining the identification of the first portable consumer article from the second location in the event that the first security system is changed from the armed state into the breached state;
identifying a location of the first portable consumer article; and
determining the location of the first portable consumer article from the second location in the event that the security system is changed from the armed state into the breached state.

43. The method of monitoring portable consumer articles at a display according to claim 42 wherein the step of operatively interacting the first system comprises associating a first sensor with the first portable consumer article, which sensor has a secured state and an unsecured state, and further comprising the steps of providing an identification for the first sensor and determining the identification of the first sensor from the second location in the event that the first sensor is changed from secured state into the unsecured state, which causes the first security system to be changed from the armed state into the breached state.

44. The method of monitoring portable consumer articles at a display according to claim 43 further comprising the step of communicating the identification of the first portable consumer article from the first location to facilitate recovery of the first consumer article.

45. A method of monitoring portable consumer articles at a display, the method comprising the steps of:
providing a first portable consumer article;
providing a first security system at a first location capable of interacting with the first portable consumer article and having (a) an armed state and at least one of (b) an unarmed state, (c) a breached state with respect to the first portable consumer article, and (d) a lost power state;
causing the first security system to generate a first signal as an incident of the first security system being placed in the armed state;
causing the first security system to generate a second signal as an incident of the first security system being placed in the unarmed state;
causing the first security system to generate a third signal as an incident of the first security system being placed in the breached state;
causing the first security system to generate a fourth signal as an incident of there being a loss of power to the first security system;
operatively interacting the first security system with the first portable consumer article;
monitoring at least one of the armed, unarmed, breached, and lost power states from a second location remote from the first location;
providing a second portable consumer article;
providing a second security system capable of interacting at a third location with the second portable consumer article and having (a) an armed state and at least one of (b) an unarmed state, (c) a breached state with respect to the first portable consumer article, and (d) a lost power state;
causing the second security system to generate a fifth signal as an incident of the second security system being placed in the armed state;
causing the second security system to generate a sixth signal as an incident of the second security system being placed in the unarmed state;
causing the second security system to generate a seventh signal as an incident of the second security system being placed in the breached state;
causing the second security system to generate an eighth signal as an incident of there being a loss of power to the second security system;
operatively interacting the second security system with the second portable consumer article;
monitoring at least one of the armed, unarmed, breached, and lost power states for the second security system from the second location;
wherein the first and third locations are within a first consumer article sales establishment and the second location is within the first consumer article sales establishment.

46. A method of monitoring portable consumer articles at a display, the method comprising the steps of:
providing a first portable consumer article;
providing a first security system at a first location capable of interacting with the first portable consumer article and having (a) an armed state and at least one of (b) an unarmed state, (c) a breached state with respect to the first portable consumer article, and (d) a lost power state;
causing the first security system to generate a first signal as an incident of the first security system being placed in the armed state;
causing the first security system to generate a second signal as an incident of the first security system being placed in the unarmed state;
causing the first security system to generate a third signal as an incident of the first security system being placed in the breached state;
causing the first security system to generate a fourth signal as an incident of there being a loss of power to the first security system;
operatively interacting the first security system with the first portable consumer article;
monitoring at least one of the armed, unarmed, breached, and lost power states from a second location remote from the first location;
providing a second portable consumer article;
providing a second security system capable of interacting at a third location with the second portable consumer article and having (a) an armed state and at least one of (b) an unarmed state, (c) a breached state with respect to the first portable consumer article, and (d) a lost power state;
causing the second security system to generate a fifth signal as an incident of the second security system being placed in the armed state;
causing the second security system to generate a sixth signal as an incident of the second security system being placed in the unarmed state;

causing the second security system to generate a seventh signal as an incident of the second security system being placed in the breached state;

causing the second security system to generate an eighth signal as an incident of there being a loss of power to the second security system;

operatively interacting the second security system with the second portable consumer article;

monitoring at least one of the armed, unarmed, breached, and lost power states for the second security system from the second location;

wherein the first and third locations are within a first consumer article sales establishment and the second location is remote from the first consumer article sales establishment.

47. In combination:

a first portable consumer article;

a first security system, the first security system operatively interacting with the first portable consumer article at a first location and having (a) an armed state, and at least one of (b) an unarmed state, (c) a breached state, and (d) a lost power state; and a communication network through which the state of the first security system can be monitored from a second location, remote from the first location, wherein the first security system causes the generation of a signal that is transmitted over the communication network with the first security system in the lost power state.

48. In combination:

a first portable consumer article;

a first security system, the first security system operatively interacting with the first portable consumer article at a first location and having (a) an armed state, and at least one of (b) an unarmed state, a breached state, (c) and (d) a lost power state;

a communication network through which the state of the first security system can be monitored from a second location, remote from the first location, wherein the first security system comprises a first sensor that has (a) a secured state attached to the first portable consumer article and (b) an unsecured state with the first sensor either (i) separated from the first portable consumer article or (ii) altered in configuration; and a personal computer at the second location through which a state of the security system is monitored through the communication network.

49. In combination:

a first portable consumer article;

a first security system, the first security system operatively interacting with the first portable consumer article at a first location and having (a) an armed state, and at least one of (b) an unarmed state, a breached state, (c) and (d) a lost power state;

a communication network through which the state of the first security system can be monitored from a second location, remote from the first location, wherein the first security system comprises a first sensor that has (a) a secured state attached to the first portable consumer article and (b) an unsecured state with the first sensor either (i) separated from the first portable consumer article or (ii) altered in configuration; and a first communication device at the second location in communication with the first security system from the second location.

wherein the first communication device comprises at least one of (a) a personal computer; (b) a telephone; (c) a pager; and (d) a text message display device.

50. The combination according to claim 49 wherein the first portable consumer article has a location that is determined by the first communication device through the communication network.

51. In combination:

a first portable consumer article;

a first security system, the first security system operatively interacting with the first portable consumer article at a first location and having (a) an armed state, and at least one of (b) an unarmed state, a breached state, (c) and (d) a lost power state;

a communication network through which the state of the first security system can be monitored from a second location, remote from the first location, wherein the first security system comprises a first sensor that has (a) a secured state attached to the first portable consumer article and (b) an unsecured state with the first sensor either (i) separated from the first portable consumer article or (ii) altered in configuration; and a first communication device at the second location in communication with the first security system from the second location, wherein the first portable consumer article has an identification that is determined by the first communication device through the communication network, wherein the identification of the first portable consumer article comprises a Universal Product Code and the first security system has a reader for identifying the first portable consumer article through the Universal Product Code.

52. In combination:

a first portable consumer article;

a first security system, the first security system operatively interacting with the first portable consumer article at a first location and having (a) an armed state, and at least one of (b) an unarmed state, (c) a breached state, and (d) a lost power state;

a communication network through which the state of the first security system can be monitored from a second location, remote from the first location; and a first communication device at the second location in communication with the first security system from the second location;

wherein the first communication device comprises at least one of (a) a personal computer; (b) a telephone; (c) a pager; and (d) a text message display device, wherein the first-portable consumer article has a location that is determined by the first communication device through the communication network, wherein the first security system comprises a first sensor that has (a) a secured state attached to the first portable consumer article and (b) an unsecured state with the first sensor either (i) separated from the first portable consumer article or (ii) altered in configuration.

53. The combination according to claim 52 wherein the first sensor and first portable consumer article each have an identification and the identification of the first sensor and the first portable consumer article can be determined through the first communication device with the first security system in the breached state.

54. The combination according to claim 53 wherein the location of the first portable consumer article can be identified through the first communication device with the first security system in the breached state.

55. In combination:
a first portable consumer article;
a first security system,
the first security system operatively interacting with the first portable consumer article at a first location and having (a) an armed state, and at least one of (b) an unarmed state, (c) a breached state, and (d) a lost power state;
a communication network through which the state of the first security system can be monitored from a second location, remote from the first location; and
a logging system for generating an information log through which the state of the first security system can be determined over a time period.

56. The combination according to claim 55 wherein the information log includes an identification of the first portable consumer article and an identification of a location for the first portable consumer article.

57. The combination according to claim 56 wherein the first security system comprises a first sensor interacted with the first portable consumer article and having a secured state and an unsecured state, the first sensor having an identification included in the information log.

58. In combination:
a first portable consumer article;
a first security system,
the first security system operatively interacting with the first portable consumer article at a first location and having (a) an armed state, and at least one of (b) an unarmed state, a breached state, (c) and (d) a lost power state;
a communication network through which the state of the first security system can be monitored from a second location, remote from the first location,
wherein the first security system comprises a first sensor that has (a) a secured state attached to the first portable consumer article and (b) an unsecured state with the first sensor either (i) separated from the first portable consumer article or (ii) altered in configuration; and
a Web server.

59. In combination:
a first portable consumer article;
a first security system,
the first security system operatively interacting with the first portable consumer article at a first location and having (a) an armed state, and at least one of (b) an unarmed state, a breached state, (c) and (d) a lost power state;
a communication network through which the state of the first security system can be monitored from a second location, remote from the first location,
wherein the first security system comprises a first sensor that has (a) a secured state attached to the first portable consumer article and (b) an unsecured state with the first sensor either (i) separated from the first Portable consumer article or (ii) altered in configuration;
wherein the first security system comprises a first generator for a detectable signal at the first location and the first generator is activated as an incident of a changing of the state of the first security system;
a server; and
a first communication device,
the first security system generating a first signal to the first signal generator as an incident of a changing of the state of the first security system,
the first security system communicating with the server and the server communicating with the first communication device.

60. The combination according to claim 59 wherein the server is a Web server.

61. In combination:
a first portable consumer article;
a first security system,
the first security system operatively interacting with the first portable consumer article at a first location and having (a) an armed state, and at least one of (b) an unarmed state, a breached state, (c) and (d) a lost power state;
a communication network through which the state of the first security system can be monitored from a second location, remote from the first location,
wherein the first security system comprises a first sensor that has (a) a secured state attached to the first portable consumer article and (b) an unsecured state with the first sensor either (i) separated from the first portable consumer article or (ii) altered in configuration; and
a camera that generates a video image of the first location to the second location.

62. In combination:
a first portable consumer article;
a first security system,
the first security system operatively interacting with the first portable consumer article at a first location and having (a) an armed state, and at least one of (b) an unarmed state, a breached state, and (d) a lost power state;
a communication network through which the state of the first security system can be monitored from a second location, remote from the first location,
wherein the first security system comprises a first sensor that has (a) a secured state attached to the first portable consumer article and (b) an unsecured state with the first sensor either (i) separated from the first portable consumer article or (ii) altered in configuration;
wherein the first security system causes the generation of a first signal that is transmitted over the communication network as an incident of the first security system changing from the armed state into the breached state with the first security system operatively interacting with the first portable consumer article,
a camera that is activated to generate a video image of the first location to the second location as an incident of the first security system changing from the armed state into the breached state with the first security system operatively interacting with the first portable consumer article.

63. In combination:
a first portable consumer article;
a first security system,
the first security system operatively interacting with the first portable consumer article at a first location and having (a) an armed state, and at least one of (b) an unarmed state, a breached state, (c) and (d) a lost power state;
a communication network through which the state of the first security system can be monitored from a second location, remote from the first location, wherein the first security system comprises a first sensor that has (a) a secured state attached to the first portable consumer article and (b) an unsecured state with the first sensor either (i) separated from the first portable consumer article or (ii) altered in configuration;

a second portable consumer article and a second security system operatively interacting with the second portable consumer article at a third location and having (a) an armed state and at least one of (b) an unarmed state, a breached state, (c) and (d) a lost power state, wherein the state of the second security system can be monitored from the second location, wherein the first and third locations are in a first consumer article sales establishment and the second location is within the first consumer article sales establishment.

64. In combination:

a first portable consumer article;

a first security system, the first security system operatively interacting with the first portable consumer article at a first location and having (a) an armed state, and at least one of (b) an unarmed state, a breached state, (c) and (d) a lost power state;

a communication network through which the state of the first security system can be monitored from a second location, remote from the first location, wherein the first security system comprises a first sensor that has (a) a secured state attached to the first portable consumer article and (b) an unsecured state with the first sensor either (i) separated from the first Portable consumer article or (ii) altered in configuration;

a second portable consumer article and a second security system operatively interacting with the second portable consumer article at a third location and having (a) an armed state and at least one of (b) an unarmed state, a breached state, (c) and (d) a lost power state, wherein the state of the second security system can be monitored from the second location, wherein the first and third locations are in a first consumer article sales establishment and the second location is remote from the first consumer article sales establishment.

65. In combination:

a first portable consumer article;

a first security system, the first security system operatively interacting with the first portable consumer article at a first location and having (a) an armed state, and at least one of (b) an unarmed state, a breached state, (c) and (d) a lost power state;

a communication network through which the state of the first security system can be monitored from a second location, remote from the first location, wherein the first security system comprises a first sensor that has (a) a secured state attached to the first portable consumer article and (b) an unsecured state with the first sensor either (i) separated from the first portable consumer article or (ii) altered in configuration;

a second portable consumer article and a second security system operatively interacting with the second portable consumer article at a third location and having (a) an armed state and at least one of (b) an unarmed state, a breached state, (c) and (d) a lost power state, wherein the state of the second security system can be monitored from the second location, wherein the first location is in a first consumer article sales establishment, the third location is in a second consumer article sales establishment remote from the first article sales establishment, and the second location is remote from the first and second consumer article sales establishments.

* * * * *

UNITED STATES PATENT AND TRADEMARK OFFICE
CERTIFICATE OF CORRECTION

| | |
|---|---|
| PATENT NO. | : 7,403,119 B2 |
| APPLICATION NO. | : 10/979594 |
| DATED | : July 22, 2008 |
| INVENTOR(S) | : Roger Leyden |

It is certified that error appears in the above-identified patent and that said Letters Patent is hereby corrected as shown below:

Claim 48 - Col. 25, ln. 38, should read as follows:

"unarmed state, (c) a breached state, and (d) a lost power state"

Claim 49 - Col. 25, ln. 58, should read as follows:

"unarmed state, (c) a breached state, and (d) a lost power state"

Claim 51 - Col. 26, ln. 17, should read as follows:

"unarmed state, (c) a breached state, and (d) a lost power state"

Claim 58 - Col. 27, ln. 37, should read as follows:

"unarmed state, (c) a breached state, and (d) a lost power state"

Claim 59 - Col. 27, ln. 54, should read as follows:

"unarmed state, (c) a breached state, and (d) a lost power state"

Claim 63 - Col. 28, ln. 63, should read as follows:

"unarmed state, (c) a breached state, and (d) a lost power state"

Claim 64 - Col. 29, ln. 22, should read as follows:

"unarmed state, (c) a breached state, and (d) a lost power state"

Claim 64 - Col. 29, lns. 36-37, should read as follows:

"armed state and at least one of (b) an unarmed state, (c) a breached state, and (d) a lost power state,"

Claim 65 - Col. 30, ln. 13, should read as follows:

"unarmed state, (c) a breached state, and (d) a lost power state"

UNITED STATES PATENT AND TRADEMARK OFFICE
CERTIFICATE OF CORRECTION

PATENT NO. : 7,403,119 B2
APPLICATION NO. : 10/979594
DATED : July 22, 2008
INVENTOR(S) : Roger Leyden It is certified that error appears in the above-identified patent and that said Letters Patent is hereby corrected as shown below:

Claim 65 - Col. 30, lns. 26-27, should read as follows:

"armed state and at least one of (b) an unarmed state, (c) a breached state, and (d) a lost power state,"

Signed and Sealed this

Sixteenth Day of December, 2008

JON W. DUDAS
*Director of the United States Patent and Trademark Office*

UNITED STATES PATENT AND TRADEMARK OFFICE
Certificate

Patent No. 7,403,119 B2                                                                       Patented: July 22, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Roger Leyden, Inverness, IL (US); and Carl E. Mandley, Henderson, NV (US).

Signed and Sealed this Second Day of July 2013.

HAI PHAN
*Supervisory Patent Examiner*
Art Unit 2685
Technology Center 2600